United States Patent [19]
Dulaney

[11] Patent Number: 5,486,231
[45] Date of Patent: Jan. 23, 1996

[54] WATER REPELLENT SOLUTION FOR WOOD AND METHOD

[76] Inventor: Donald C. Dulaney, 5109 Comanche Way, Madison, Wis. 53704

[21] Appl. No.: 236,329

[22] Filed: May 2, 1994

[51] Int. Cl.$^6$ .......................... C09K 3/18; C09D 191/00; C09D 7/12
[52] U.S. Cl. ..................................... 106/243; 106/287.18
[58] Field of Search ................................ 106/243, 287.18

[56] References Cited

PUBLICATIONS

Quilon® Brochure, Published Apr., 1992, DuPont Chemicals.

*Primary Examiner*—David Brunsman
*Attorney, Agent, or Firm*—Wood, Phillips, VanSanten, Clark & Mortimer

[57] ABSTRACT

A water repellent solution for wood includes an organometallic complex of a hydrophobic fatty acid coordinated with a halogenated trivalent chromium and water having a reduced pH prior to mixing with the complex. The solution imparts water repellency and a preservative effect to the wood. Wood treated with the solution has the treatment bonded thereto by a reaction between the wood and the solution.

23 Claims, No Drawings

5,486,231

WATER REPELLENT SOLUTION FOR WOOD AND METHOD

TECHNICAL FIELD

This invention generally relates to a water repellent for wood. More particularly, the invention relates to a water repellent solution for wood that exhibits a reduced volatile organic compound content.

BACKGROUND OF THE INVENTION

Penetration of water into wood is highly undesirable for a number of reasons. The water swells the wood and can cause grain raise which results in an uneven surface. Repeated wetting and drying can result in cracking of the wood due to the repeated swelling and contracting. The repeated swelling and contracting can also pop nails out of the wood. Penetration of moisture into the wood facilitates the growth of mildew and other organisms that can destroy the wood.

Prolonged exposure to a volatile organic compound ("VOC") can be hazardous to a person's health. Representative VOCs include solvents such as methyl ethyl ketone, trichloroethylene and the like.

Many water repellents have a relatively high VOC content due to the use of the VOC as a solvent. Government regulations are being phased in to limit the VOC content.

Water-based water repellents for wood often are not stable and therefore have a very short shelf life. The user of these water repellents can be required to add water just before use to compensate for the short shelf life. This is undesirable because it creates additional work for the user and can result in an improper amount of water being added or inadequate mixing.

Some water repellents form a coating on the wood which changes the wood's appearance. A change in appearance is highly undesirable, especially when using fine quality wood whose natural beauty is masked by the coating.

DuPont Chemicals manufactures a chrome complex solution under the trademark QUILON®. The brochure of April 1992, at page 5, indicates that salts of hydrochloric acid have little effect on solution solubility. The brochure at page 6 state that aqueous solutions of QUILON® prepared at room temperature remain stable for more than 24 hours at temperatures below 30° C. (80° F.). At 40° C. (110° F.) the working life shortens to 8 hours. These short time periods make QUILON® unsuitable for products that must be stable for a long time period. The brochure is silent as to the use of QUILON® as a wood preservative.

To reduce the VOC content in wood stains, manufacturers are developing water-based stains. However, these stains do not color evenly, as some sections of the untreated wood absorb more water, and hence more colorant, than others. The water-based stains are not conventionally used with water repellent treated wood.

A water repellent solution having a reduced VOC content and which has a long, stable shelf life and a preservative effect on wood is highly desirable.

SUMMARY OF THE INVENTION

The invention provides a water repellent solution for wood that has a significantly reduced volatile organic compound (VOC) content and a long shelf life. The solution also preserves wood by inhibiting growth of mildew and organisms in the wood.

According to the invention, the solution includes an organo-metallic complex of a hydrophobic fatty acid coordinated with a halogenated trivalent chromium and water having a reduced pH, preferably the reduction is accomplished by a halogen-ion-containing component. The solution is very, stable and has a long shelf life. It is critical to reduce the pH of the water prior to mixing with the complex. Preferably, the reduced pH water has a pH in the range of about 0.5 to about 2.0.

The invention is also to a piece of wood having a treatment bonded thereto by a reaction between the wood and the solution; a method of making the solution including the steps of reducing the pH of water and combining the reduced pH water and the complex; and a method of using the complex to impart water repellency and a preservative effect to wood including the steps of applying to the wood a solution including the complex and bonding an amount of the complex to the wood to impart water repellency and a preservative effect.

The solution is also useful as a pretreatment for wood that is to be stained, especially with a water-based stain. Because the water of the stain does not penetrate, the amount of stain required is reduced, and a uniform appearance is achieved.

The solution is useful in preserving wood that has not been painted or stained and that is exposed to the environment, such as the wood used in decks and docks.

Numerous other advantages and features of the present invention will become readily apparent from the following detailed description of the preferred embodiments and the appended claims.

DETAILED DESCRIPTION OF THE PREFERRED EMBODIMENTS

Although this invention is susceptible to embodiment in many different forms, there are described in detail herein, presently preferred embodiments of the invention. It should be understood, however, that the present disclosure is to be considered as an exemplification of the principles of this invention and is not intended to limit the invention to the embodiments described.

A water repellent solution suitable for treatment of wood includes an organo-metallic complex of a hydrophobic fatty acid coordinated with a halogenated trivalent chromium and water having a pH reduced by a pH reducing component. The pH reducing component is preferably a halogen-ion-containing component. The solution makes the wood water repellent and provides a preservative effect. The solution is stable and has a long shelf life. The volatile organic content (VOC) of the solution is relatively low.

The complex includes a trivalent chromium ion that forms a coordinate complex with the fatty acid. It is presently theorized that the complex has a chemical structure as follows:

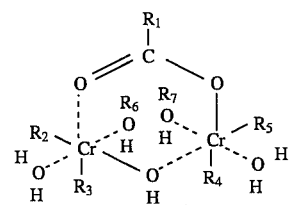

wherein: $R_1$ represents a $C_{10}$–$C_{20}$ fatty acid radical; $R_2$ to $R_5$ are alike or different and represent a halogen; and $R_6$ and $R_7$ are alike or different and represent a $C_1$–$C_5$ lower alkyl group. Preferably, $R_1$ is a $C_{13}$–$C_{17}$ fatty acid radical, $R_2$ to $R_5$ are chlorine and $R_6$ and $R_7$ are both alkyl groups containing three carbon atoms.

The fatty acid radical is selected to contribute to the water repellency effect of the solution and can be from a $C_{14}$–$C_{18}$ fatty acid.

Representative halogens are elements of Group VIIA of the Periodic Table and include fluorine, chlorine, bromine, iodine and astatine. Chlorine is the preferred halogen.

An organo-metallic complex-containing solvent solution can be utilized in the water repellent solution. Representative solvents include acetone and isopropyl alcohol.

Representative complexes include: chromium, pentahydroxy(tetradecanoato)di-; tetradecanoato chromic chloride hydroxide (1:2:4:1); octadecanoato chromic chloride hydroxide (1:2:4:1); the like and mixtures thereof.

Representative of commercially available complexes is the QUILON® family of chrome complexes from DuPont Chemicals, Wilmington, Delaware. QUILON® C is the presently preferred complex.

The water, prior to having its pH reduced, will be discussed in this paragraph. The water preferably has been treated by a municipal water treatment facility and has residual chlorine or chloride. Ordinary tap water having a chemical composition of an alkalinity (total $CaO_3$) of 300 to 400, barium 0.01 to 0.1 milligrams per liter (mg/l), calcium 85 to 105 mg/l, chloride 30 to 70 mg/l, fluoride 0.10 to 0.25 mg/l, harness (total $CaO_3$) 430 to 450, iron 0.05 to 0.15 mg/l, magnesium 40 to 60 mg/l, manganese 0.01 to 0.1 mg/l, nickel 0.001 to 0.01 mg/l, nitrogen ($NO_3$+$NO_2$) 3.5 to 4.5 mg/l, pH 8 to 8.5, sodium 10 to 20 mg/l and sulfate 30 to 40 mg/l can be used. The water preferably has a chloride content of about 30 to about 70 mg/l. Distilled and de-ionized water typically have no minerals, especially chlorine, and, therefore, are less desirable.

The pH is reduced by a component selected to reduce the pH of the water to a range of about 0.5 to about 2.0. Preferably, the pH of the water is reduced to about 1.0. Adjusting the pH of the water prior to mixing with the complex is critical to the prevention of polymerization of the complex and production of a solution that has a good shelf life. Preferably, the pH reducing component contains halogen ions. It is presently theorized that the presence of halogen ions in the water that are the same as the halogen of the complex further contributes to the stability of the solution.

It is presently theorized that strong oxidizing acids, e.g., sulfuric acid, causes the chrome complex to come out of solution whereas strong reducing acids, e.g., those disclosed hereinafter, help maintain the chrome complex in solution.

Representative pH reducing components include hypophosphorous acid, hydrochloric acid, sodium hypochlorite, calcium hypochlorite, the like and mixtures thereof, A preferred pH reducing component is a halogen-containing component, e.g., hydrochloric acid, sodium hypochlorite, calcium hypochlorite, the like and mixtures thereof. A hypochlorite is preferably present. The hypochlorite eliminates the white ring that appears after about 12 hours when distilled water is used. Preliminary testing indicates that hypophosphorous acid may work very well.

Preferably, the water repellent solution contains the complex in an amount in the range of about 1.0 to about 10.0 weight percent (wt %), the water in an amount in the range of about 90 to about 98 wt % and the pH reducing component in an amount in the range of about 0.5 to about 1.0 wt %, the wt %s being based on the total weight of the complex, water and pH reducing component. A mixture of hydrochloric acid and sodium hypochlorite in a weight ratio range of about 1:1 to about 3:1 is a preferred halogen-containing component. Preferably, the hypochlorite is present in the water repellent solution in an amount in the range of about 150 to about 450 parts per million. The VOC content of the solution preferably is 0 to about 10, more preferably 0 to about 5, wt %.

Time water repellent solution can be prepared at ambient temperature, i.e., a temperature in the range of about 65° to about 85° F., using a suitable vessel. The water and pH reducing component are introduced into the vessel with mixing. Then, the complex is introduced while maintaining mixing. After a substantially homogeneous solution is produced, the mixing is stopped and the solution packaged, preferably in an air-tight container.

The shelf life, depending on the number of times the container is opened and resealed and the environment to which the opened container is exposed, can be about 6 to about 12 months.

A piece of wood having a treatment that is bonded thereto is also disclosed. The bonding is theorized to be by a reaction between the wood and a solution that includes the organo-metallic complex. The solution can also include water having its pH reduced by the pH reducing component.

A method of making the organo-metallic complex-containing solution includes the steps of reducing the pH of water, preferably by using a halogen-ion-containing component, and combining the water having a reduced pH with the organo-metallic complex.

A method of using the organo-metallic complex to impart water repellency and a preservative effect to wood includes the steps of applying a solution to the wood that includes the organo-metallic complex and bonding an amount of the complex to the wood that is effective to impart water repellency and a preservative effect.

The solution can also be used in a method for staining wood. The method includes the step of treating the wood with the water repellent solution followed by applying a conventional water-based stain to the treated wood. A preferred stain is a water-based stain, i.e., one which contains water as the main solvent.

The following examples are presented by way of illustration and not limitation.

EXAMPLE 1: WATER-REPELLENT SOLUTION

A water-repellent solution of the present invention was prepared at ambient temperature by introducing 944 pounds of tap water into a suitably vessel, initiating mixing and introducing 7.4 pounds of 30% hydrochloric acid into the vessel to reduce the pH of the water to about 1.0. The tap water had the following composition: an alkalinity (total $CaO_3$) of 350, barium 0.06 milligrams per liter (mg/l); calcium 95 mg/l; chloride 48 mg/l; fluoride 0.18 mg/l; harness (total $CaO_3$) 440, iron 0.09 mg/l; magnesium 49 mg/l; manganese 0.04 mg/l; nickel 0.006 mg/l; nitrogen ($NO_3$+$NO_2$) 3.98 mg/l, pH 8.1, sodium 14 mg/l, and sulfate 34 mg/l. Then, 48.6 lbs. of QUILON®, commercially available from DuPont Chemicals, Wilmington, Delaware, was introduced into the vessel. The solution had a pH of about 1.0. The VOC content, which was entirely from the QUILON®, was only about 3.6 wt %.

The shelf life of the solution was determined by storing the solution at ambient temperature in an air-tight container and periodically opening the container, applying the solution to a piece of wood, permitting the solution to react and dry and then applying water to the treated wood to determine if the water beaded up or penetrated into the wood. If the water beaded up, the water repellent solution was still performing satisfactorily and had not passed its useful shelf life. The solution had a shelf life of at least about 6 months.

EXAMPLE 2: WATER-REPELLENT SOLUTION CONTAINING SODIUM HYPOCHLORITE

Water repellent solutions of the present invention were prepared at ambient temperature by introducing 939.55 pounds of tap or distilled water into a suitable vessel, initiating mixing and introducing 7.4 pounds of 30% hydrochloric acid and 4.45 pounds of a 5.25% aqueous solution of sodium hypochlorite into the vessel to reduce the pH of the water to about 1.0. The tap water had the composition described above in EXAMPLE 1. The distilled water had substantially no chemicals or minerals in it. Then, 48.6 pounds of QUILON® was introduced into the vessel. The solution had a pH of about 1.0. The VOC content, which was entirely from the QUILON® was only about 3.6 weight percent.

The water repellent solution made using the tap water had a shelf life of at least about 6 months.

The water repellent solution made using the distilled water did not exhibit the formation of a white ring on the container even after several weeks. Without the sodium hypochlorite the use of distilled water would result in the formation of the ring within about 12 hours of standing.

It is presently theorized that the stability of the water repellent solution is achieved due to the reduction of the pH of the water prior to mixing with the complex. Furthermore, the use of a halogen-containing component that has the same halogen ion as the complex is also theorized to contribute to the stability.

It is presently theorized that the hydroxyl groups of the wood cellulose react with the chromium-containing part of the complex and bond thereto to form a treatment that is ideally only one molecule thick. The fatty acid is oriented away from the wood surface and provides the water repellent characteristic of the solution. The chrome inhibits the growth of mildew and other organisms in the wood that contribute to wood decay. The solution is particularly well suited for preserving wood that will receive no further treatment, especially wood that is exposed to the environment.

The solution can also be used for wood that will receive a subsequent stain to reduce the amount of stain required and produce a uniform color. The use of the solution prior to staining the wood is particularly beneficial when the stain is one which preserves the natural look of the wood as opposed to an opaque stain that covers the wood.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

I claim:

1. A water repellent solution having a long shelf life and that is suitable for treatment of wood, the solution comprising:

an organo-metallic complex of a hydrophobic fatty acid coordinated with a halogenated trivalent chromium; and water having a pH reduced by a pH reducing component that is distinct from the organo-metallic complex and that is a strong reducing acid.

2. The solution of claim 1 wherein the pH reducing strong reducing acid is a halogen-ion-containing component.

3. The solution of claim 2 wherein the halogen of the complex and of the halogen-ion-containing strong reducing acid are alike.

4. The solution of claim 1 wherein the pH of the pH reduced water is in the range of about 0.5 to about 2.

5. The solution of claim 1 wherein the fatty acid is a $C_1$–$C_{18}$ fatty acid.

6. The solution of claim 1 wherein the complex has the chemical formula:

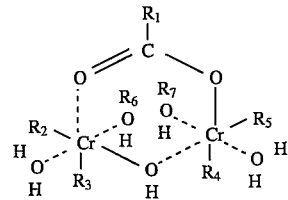

wherein: $R_1$ represents a $C_{10}$–$C_{20}$ fatty acid radical; $R_2$ to $R_5$ are alike or different and represent a halogen: and $R_6$ and $R_7$ are alike or different and represent a $C_1$–$C_5$ lower alkyl group.

7. The solution of claim 6 wherein the $R_1$ is a $C_{13}$–$C_{17}$ fatty acid radical, $R_2$ to $R_5$ are chlorine and $R_6$ and $R_7$ are both alkyl groups containing three carbon atoms.

8. The solution of claim 1 wherein the complex is selected from the group consisting of: chromium, pentahydroxy(tetradecanoato)di-; tetradecanoato chromic chloride hydroxide (1:2:4:1); octadecanoato chromic chloride hydroxide (1:2:4:1); and mixtures thereof.

9. The solution of claim 1 wherein the pH reducing component is a mixture of hydrochloric acid and a hypochlorite.

10. The solution of claim 1 wherein the complex is present in an amount in the range of about 1 to 10 weight percent; the water is present in an amount in the range of about 90 to about 98 weight percent; and the pH reducing component is present in an amount in the range of about 0.5 to about 1 weight percent, the weight percents being based on the total weight of the complex, water and pH reducing component.

11. The solution of claim 10 wherein the pH of the reduced pH water is about 1.

12. The solution of claim 1 wherein the solution has a shelf life of about 6 to about 12 months in a sealed container at ambient temperature.

13. A method of making an organo-metallic complex-containing solution having a long shelf life comprising the steps of:

reducing the pH of water with a pH reducing component that is a strong reducing acid; and combining the water having the reduced pH and an organo-metallic complex of a hydrophobic fatty acid coordinated with a halogenated trivalent chromium, the pH reducing component and the organo-metallic complex being distinct.

14. The method of claim 13 wherein the pH reducing component is a halogen-ion-containing strong reducing acid having a halogen that is the same as the halogen of the complex.

15. The method of claim 13 wherein the reducing step is the step of reducing the pH to a pH in the range of about 0.5 to about 2.

16. The method of claim 13 wherein the fatty acid is a $C_{14}$–$C_{18}$ fatty acid.

17. The method of claim 13 wherein the complex has the chemical formula:

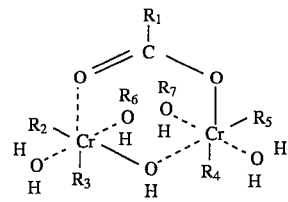

wherein: $R_1$ represents a $C_{10}$–$C_{20}$ fatty acid radical; $R_2$ to $R_5$ are alike or different and represent a halogen; and $R_6$ and $R_7$ are alike or different and represent a $C_1$–$C_5$ lower alkyl group.

18. The method of claim 17 wherein $R_1$ is a $C_{13}$–$C_{17}$ fatty acid radical, $R_2$ to $R_5$ are chlorine and $R_6$ and $R_7$ are both alkyl groups containing three carbon atoms.

19. The method of claim 13 wherein the complex is selected from the group consisting of: chromium, pentahydroxy(tetradecanoato)di-; tetradecanoato chromic chloride hydroxide (1:2:4:1); octadecanoato chromic chloride hydroxide (1:2:4:1); and mixtures thereof.

20. A water repellent solution that has a long shelf life and is suitable for treatment of wood, the solution comprising:

an organo-metallic complex of a hydrophobic fatty acid coordinated with a halogenated trivalent chromium, the fatty acid being a $C_{14}$–$C_{18}$ fatty acid; and water having a pH reduced by a pH reducing component that is a halogen-ion-containing component that is distinct from the organo-metallic complex and that is a strong reducing acid.

21. The solution of claim 20 wherein the complex has the chemical formula:

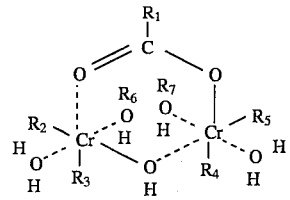

wherein: $R_1$ represents a $C_{10}$–$C_{20}$ fatty acid radical; $R_2$ to $R_5$ are alike or different and represent a halogen; and $R_6$ and $R_7$ are alike or different and represent a $C_1$–$C_5$ lower alkyl group.

22. The solution of claim 21 wherein $R_1$ is a $C_{13}$–$C_{17}$ fatty acid radical, $R_2$ to $R_5$ are chlorine and $R_6$ and $R_7$ are both alkyl groups containing three carbon atoms.

23. The solution of claim 20 wherein the complex is present in an amount in the range of about 1 to 10 weight percent; the water is present in an amount in the range of about 90 to about 98 weight percent; and the pH reducing component is present in an amount in the range of about 0.5 to about 1 weight percent, the weight percents being based on the total weight of the complex, water and pH reducing component.

* * * * *